(12) United States Patent
Grosset et al.

(10) Patent No.: US 8,484,252 B2
(45) Date of Patent: Jul. 9, 2013

(54) GENERATION OF A MULTIDIMENSIONAL DATASET FROM AN ASSOCIATIVE DATABASE

(75) Inventors: Robin Grosset, Ottawa (CA); David Hood, London (GB)

(73) Assignee: International Business Machines Corporation, Armonk, NY (US)

( * ) Notice: Subject to any disclaimer, the term of this patent is extended or adjusted under 35 U.S.C. 154(b) by 1438 days.

(21) Appl. No.: 11/565,449

(22) Filed: Nov. 30, 2006

(65) Prior Publication Data

US 2008/0133568 A1    Jun. 5, 2008

(51) Int. Cl.
    *G06F 7/00*    (2006.01)
(52) U.S. Cl.
    USPC ........................................................ 707/802
(58) Field of Classification Search
    USPC .................. 707/100, 102, 101, 802
    See application file for complete search history.

(56) References Cited

U.S. PATENT DOCUMENTS

| 2002/0091707 A1* | 7/2002 | Keller ........................ 707/104.1 |
| 2005/0149550 A1* | 7/2005 | Berger et al. ................. 707/102 |
| 2006/0218157 A1* | 9/2006 | Sourov et al. ................ 707/100 |

OTHER PUBLICATIONS

Simon Williiams, The Associative Model of Data, 2002, Lazy Software Ltd, Second Edition, p. 1-272.*
The Associative Model of Data White Paper, www.lazysoft.com, Lazysoft Technology, pp. 1-16 (2003).
International Search Report and Written Opinion from corresponding PCT application serial No. PCT/US07/22787, dated Jun. 24, 2008 (11 pages).
International Preliminary Report on Patentability from corresponding PCT Application Serial No. PCT/US07/22787, dated Jun. 11, 2009 (10 pages).

* cited by examiner

*Primary Examiner* — Amy Ng
(74) *Attorney, Agent, or Firm* — Shumaker & Sieffert, P.A.

(57) ABSTRACT

Techniques are described of applying on-line analytical processing (OLAP) to associative databases. For instance, a database adapter implemented in computer hardware or software may automatically create dimensions in a multidimensional dataset for data types in an associative database. The database adapter may then query the associative database for metadata that describes index values of each dimension of the multidimensional dataset. The database adapter may then query the associative database for data values to populate individual cells of the multidimensional database.

33 Claims, 8 Drawing Sheets

GENERATION OF A MULTIDIMENSIONAL DATASET FROM AN ASSOCIATIVE DATABASE

TECHNICAL FIELD

The invention relates to computer databases, and particularly to associative databases.

BACKGROUND

An associative database stores data in two basic types of items: entity instances and relation instances. Each entity instance has a unique identifier, a name, and a type. Entity instances are discrete items that have independent existence. In contrast, each relation instance is a "link" or "association" that specifies other items. Each relation instance includes a unique identifier, a source identifier, a verb identifier, and a target identifier. Source identifiers, verb identifiers, and target identifiers of relations specify the identifiers of entity instances. Thus, relations describe associations between items. For the purpose of clarity, associative database items are set forth in a fixed-width font. Names of entity instances are preceded by the "$" sign. Furthermore, names of entity instances used as verb items are set forth herein in an italicized fixed-width font. For example, entity instance "1" may have the name "$ cat", entity instance "2" may have the name "$ sat on", and entity instance "3" may have the name "$ mat". A relation instance having identifier "10" may specify "1" as the source identifier, "2" as the verb identifier, and "3" as the target identifier. Thus, relation "10" may describe the relation "(cat sat on mat)".

An associative database may describe more sophisticated associations by allowing identifiers of relation instances to be source or target identifiers. Continuing the previous example, entity instance "4" may have the name "$ is colored" and entity instance "5" may have the name "$ red". A relation instance having identifier "11" may specify "3" as a source identifier, "4" as the verb identifier, and "5" as the target identifier. Thus, relation instance "11" may describe the relation "(mat is colored red)" Now, if relation instance "10" specified "1" as the source identifier, "2" as the verb identifier, and "11" as the target identifier, relation instance "10" would describe the association, "(cat sat on (mat is colored red))." This relation describes the idea that a cat sat on a mat that is colored red. By building such associations, an associative database may store any type of information.

SUMMARY

In general, the invention is directed to techniques of applying on-line analytical processing (OLAP) or other multidimensional data modeling techniques to associative databases. OLAP, for example, is a technique that provides answers to analytical queries that are multi-dimensional in nature. Databases configured for OLAP employ a multidimensional data model. Typically, this data model utilizes multidimensional data stored in the form of a data cube or dataset. A cube or dataset include one or more measures and a plurality of dimensions that form a multidimensional data space. Each dimension has attributes and dimensional hierarchies that organize data elements for the dimension. Each data element is stored as a "tuple" within the multi-dimensional data space, where the multidimensional tuple comprises a finite sequence of objects, each of a specified type.

An OLAP system may store these multidimensional tuples within a B-tree or other tree data structure for efficient retrieval and maintenance. The OLAP system may store the tuples to the B-tree or other data storage structure such that the tuples are sorted within the data structure based on one of the component objects of the multidimensional tuple. For example, multidimensional tuples may store objects having dimensions of types "Name," "Store," "Date," and "Product." OLAP is frequently used in the context of sales, marketing, management reporting, business process management, and customer relation management (CRM).

As described herein, a multidimensional dataset may be automatically generated from one or more underlying associative databases, and OLAP queries may then be performed on the multidimensional dataset. As an example, a user of an enterprise software system may specify entities in an associative database to serve as dimensions of a multidimensional dataset. In addition, the user may specify a relation in the associative database to or from an entity whose entity instances have name values from which measure values of the multidimensional dataset may be derived. These quantitative values may serve as data values in cells of the multidimensional dataset. This relation may be referred to herein as a "measure relation." The entity whose entity instances have name values from which measure values may be derived may be referred to herein as a "measure entity." In general, measure values may be derived from name values that specify quantitative values. After specifying the dimensions and the measure relation, the user may request that the enterprise software system automatically generate a multidimensional dataset from the associative database(s) or otherwise resolve multidimensional operations with the associative database(s) using the specified dimensions and measure relation.

In one example, to generate a multidimensional dataset from the associative database, the enterprise software system automatically (e.g., dynamically) creates the multidimensional dataset to include a dimension for each of the specified dimensions. To provide index values for the dimensions of the multidimensional dataset, the enterprise software system may construct queries for each of the dimensions and issue the queries to the associative database. Each of the queries may, for example, identify instances of one or more entities within the associative database from which the index values for a dimension may be derived. After constructing a query for each of the dimensions, the enterprise software system may perform the queries on the associative database and derive index values for each of the dimensions. The enterprise software system may then dynamically insert these index values into the multidimensional dataset.

After dynamically inserting the index values into the multidimensional dataset, the enterprise software system may construct one or more queries for the associate database to identify instances of the measure entity from which measure values may be derived. For each identified instance of the measure entity, the query for the associative database also identifies an entity instance for each dimension from which an index value may be derived. The enterprise software system may then perform the query on the associative database and derive measure values and, for each of the measure values, an index value for each of the dimensions. The enterprise software system may then dynamically insert the measure values into the newly created multidimensional dataset at the cells identified by the combination of the index values for each of the dimensions. After the enterprise software system inserts the data values into the cells of the multidimensional dataset, the enterprise software system may perform one or more OLAP queries on the multidimensional dataset to resolve or otherwise perform multidimensional operations with respect to the data contained within the underlying associative database(s).

In one embodiment, a method comprises automatically generating a multidimensional dataset from an associative database, wherein the multidimensional dataset includes one or more measure values and a plurality of dimensions, and wherein the associative database conforms to an associative model of data. The method also comprises performing one or more operations on the multidimensional dataset and outputting a result from the operations on the multidimensional dataset.

In another embodiment, a computing device comprises an associative database that conforms to an associative model of data. The device also comprises a database adapter to automatically generate a multidimensional dataset from the associative database, wherein the multidimensional dataset includes one or more measure values and a plurality of dimensions. In addition, the computing device comprises a software module to perform one or more operations on the multidimensional dataset and to output a result from the operations on the multidimensional dataset.

In another embodiment, a computer-readable medium comprises instructions. The instructions cause a programmable processor to execute software to automatically generate a multidimensional dataset from an associative database by accessing the associative database to extract (i) metadata for each dimension of the multidimensional dataset, and (ii) measure values from the associative database for cells in the multidimensional dataset. In addition, the instructions cause the processor to perform one or more operations on the multidimensional dataset and to output a result from the operations on the multidimensional dataset.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
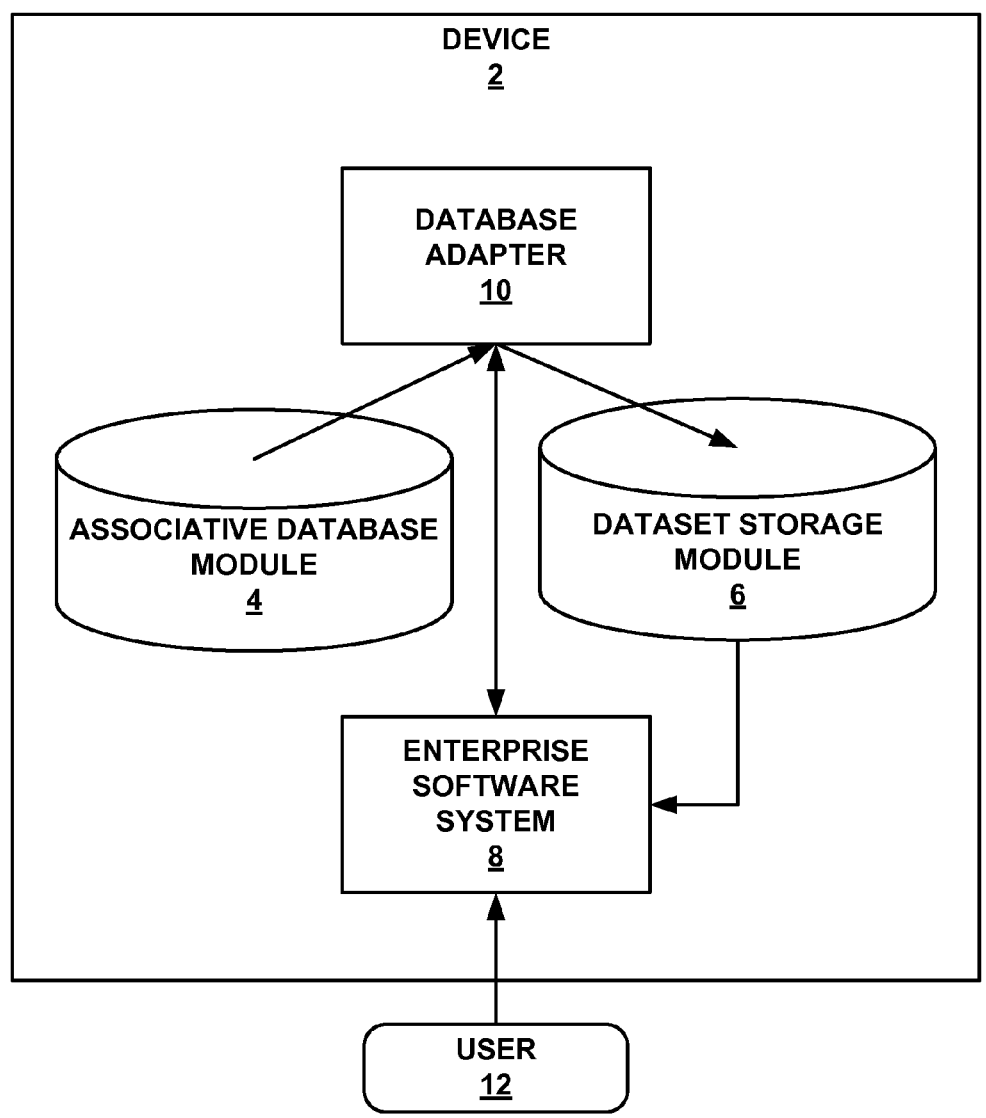
FIG. 1 is a block diagram illustrating an exemplary device 2 that generates a multidimensional dataset from an associative database and performs operations on the multidimensional dataset.

FIG. 1 is a block diagram illustrating an exemplary device 2 that generates a multidimensional dataset from an associative database and performs operations on the multidimensional dataset. Device 2 may be one of several types of computing devices. For instance, device 2 may be a database server, a personal computer, a workstation, a mainframe computer, a network server, a data warehousing system, a network data center, or otherwise.

As illustrated in the example of FIG. 1, device 2 includes an associative database module 4 to store data in the form of an associative database, i.e., in a form that conforms to the associative model of data. In addition, device 2 includes an enterprise software system 8. Enterprise software system 8 may include functions to manipulate, summarize and display enterprise information stored in the associative database maintained in associative database module 4. For example, enterprise software system 8 may display enterprise information in a spreadsheet, a chart, a graph, or otherwise. Because it may be more efficient to summarize, display, analyze, and manipulate the enterprise information using multidimensional operations, enterprise software system 8 may request that a database adapter 10 generate a multidimensional dataset that includes some or all of the information in the associative database in associative database module 4.

For example, a user 12 may enter an On-Line Analytical Processing (OLAP) query in enterprise software system 8. The OLAP query may identify specific enterprise data. For example, in some embodiments, user 12 may input the OLAP query in a Multi-Dimensional eXpressions (MDX) language. When user 12 inputs the query, enterprise software system 8 may send a request to database adapter 10. In response to the request, database adapter 10 may generate a multidimensional dataset that includes data required by the OLAP query from an associative database in associative database module 4. Enterprise software system 8 may perform the OLAP query on the multidimensional dataset generated by database adapter 10. Because enterprise software system 8 sends the OLAP query to database adapter 10 and receives a multidimensional dataset from database adapter 10, the fact that data is stored in an associative database may be hidden from enterprise software system 8. In some embodiments, database adapter 10 may store previously generated multidimensional dataset in dataset storage module 6 to be used in responding to subsequent requests.

An associative database maintained in associative database module 4 conforms to the associative model of data. For example, an associative database may represent information using entity instances and relation instances. Each of the relation instances may specify an entity instance as a source instance, an entity instance as a verb instance, and an entity instance as a target instance. Within an associative database in associative database module 4, entities define types of entity instances. In other words, entity instances in the example associative database may be classified as being instances of a type of entity. For example, the entity instance having the name "$ banana" may be an instance of an entity that describes a product. Furthermore, entity instances having the names "$ apple" and "$ orange" may also be instances of this "# product" entity. To avoid confusion with the names of entity instances, the names of entities are preceded with the "#" symbol. In general, an administrator may organize an associative database such that relation instances specify instances of a first entity as a source, and specify instances of a second entity as a target. For this reason, relations may define types of relation instances that specify types of entity instances (i.e., entities). In this way, the administrator may define an associative database in terms of entities and relations without reference to individual entity instances or relation instances. For example, the administrator may define an associative database as having the relation "((Customer purchased Food) for Amount)," wherein "Customer," "Food," and "Amount" are entities.

In general, a multidimensional dataset generated by database adapter 10 may be visualized as a matrix having a plurality of dimensions. For example, if a multidimensional dataset has two dimensions, the multidimensional dataset may be visualized as a flat grid. If a multidimensional dataset has three dimensions, the multidimensional dataset may be visualized as a cube. Each cell in the multidimensional dataset may contain a quantitative measure value. For example, each cell in the multidimensional dataset may contain a measure value indicating an amount of money. Each cell in the multidimensional dataset may be identified by providing an index value from each one of the dimensions of the multidimensional dataset. That is, a measure value may be identified by stating that the measure value lies at dimension index value i in the first dimension and dimension index value j in the second dimension. This measure value may also be denoted $A_{ij}$, where A is an identifier of the dataset. For example, if dataset A has two dimensions, a cell in the multidimensional dataset may be identified by stating that the cell is located in the sixth row and the fifth column of the multidimensional dataset (e.g., $A_{6,5}$).

A multidimensional dataset generated by database adapter 10 may contain enterprise data. For example, assume an enterprise has eight customers, sells ten products, and sells the products over six days at varying prices. In this case, a first dimension of the multidimensional dataset may describe customers of the enterprise, a second dimension of the dataset may describe products, and a third dimension of the dataset may describe time. Data in individual cells of the multidimensional dataset may reflect a price paid by a customer for a product at a certain time. If customer "5" purchased product "apple" on day "2" for $50, the enterprise may record this purchase by entering "$50" in multidimensional data element $A_{5, apple, 2}$.

Database adapter 10 may generate many different multidimensional datasets from data in the associative database in associative database module 4. For instance, user 12 may specify entities of an associative database to serve as dimensions of a multidimensional dataset. In addition, user 12 may specify a relation in the associative database as measure relation. A source or target of the measure relation specifies an entity whose instances have name values from which measure values may be derived. This entity is referred to herein as the "measure entity." For example, user 12 may specify a relation in an associative database that specifies the "# Amount" entity whose instances have name values describe amounts of money. Database adapter 10 may use these amounts of money as measure values. In this example, the "# Amount" entity may be the measure entity. Furthermore, user 12 may specify "# Customer", "# Product", and "# Date" entities as entities from which index values of the multidimensional dataset may be derived. In this way, user 12 may specify a multidimensional dataset in which each cell represents an amount of money paid by a customer for a product on a particular date. Alternatively, if the identity of the customer is not important to user 12, user 12 may simply specify "# Product" and "# Date" entities as entities from which index values for a multidimensional dataset are derivable. In this alternative example, each cell represents an amount of money paid for a product on a particular date.

To provide more descriptive index values for a dimension, user 12 may specify that several different entities from which individual index values of the dimension are derivable. For example, an associative database may include a "# Product" entity, a "# Product Subcategory" entity, and a "# Product Subcategory" entity, each of which are directly or transitively related to one another. User 12 may specify that each of these entities as entities from which individual index values of a product dimension may be derived. As a result, a single index value in the product dimension may be derived from an instance of the "# product" entity, an instance of the "# Product Subcategory" entity, and an instance of the "# Product Category" entity. For example, an instance of the entity "# Product" having the name value "$ banana", an instance of the entity "# Product Subcategory" having the name "$ fruit", and an instance of the entity "# Product Category" having the name "$ food" may be sources of a single index value in the product dimension. In this example, this index value may appear as "food/fruit/banana."

When database adapter 10 receives a request to generate a multidimensional dataset having particular dimensions and a particular measure relation from an associative database in associative database module 4, database adapter 10 may create a multidimensional dataset having the particular dimensions and the particular measure relation. To generate the multidimensional dataset, database adapter 10 may, for example, extract metadata from the associative database for each of the dimensions. In this context, the term "metadata" may describe index values of a dimension. Database adapter 10 may then insert the metadata from each of the dimensions into an empty multidimensional dataset. After database adapter 10 has inserted the metadata for each of the dimensions into the multidimensional dataset, the cells of the multidimensional dataset do not yet contain measure data. To populate the cells in the multidimensional dataset, database adapter 10 extracts measure values from the associative database and inserts the measure values into the cells in the multidimensional dataset.

To extract metadata from an associative database, database adapter 10 may construct a query for each of the requested dimensions. A query for a dimension identifies instances of one or more entities in the associative database having names from which the metadata for the dimension may be derived. Details of how database adapter 10 constructs these queries are explained below. After constructing queries for each of the dimensions, database adapter 10 may perform the queries to identify instances of the entities from which the metadata for the dimensions may be derived. Then, for each dimension, database adapter 10 may derive index values for the dimension from the name values of the identified instances. Database adapter 10 may then insert the derived index values into the multidimensional dataset as index values of the dimensions.

To extract measure values from an associative database, database adapter 10 may construct another query to identify entity instances of a measure entity in the associative database. The query identifies entity instances from which the data for each measure value may be derived. Details of how database adapter 10 constructs this query are also explained below. After performing this query, database adapter 10 may derive measure values to populate the cells of the multidimensional dataset. Moreover, for each derived measure value, database adapter 10 may derive metadata that identifies a cell of the multidimensional dataset into which the measure value is to be placed. Database adapter 10 may then insert the measure values into appropriate cells in the multidimensional dataset.

A query for the associative database maintained by associative database module 4 may take the form of a query request tree. A query request tree comprises a hierarchy of entity and relation items. The items in the query request tree are related to an entity or relation item at the root of the query request tree (i.e., the top of the hierarchy). For example, the following may be a query request tree that identifies all customers who purchased food for an amount:

```
→ ((Customer purchased Food) for Amount)
    ← (Customer purchased Food)
        # Customer
        # Food
    # Amount
```

In this example query, the "#" symbol denotes an entity and the left arrow symbol "←" denotes a relation that is a source of a higher-level relation.

Database adapter 10 may perform a query by first identifying in the associative database instances of an item at the root of the request tree. Then, for each of the identified instances of the item at the root of the request tree, the query engine follows relations from the identified items to identify instances of items specified in the result tree. When the query engine finishes performing the query, the query engine has constructed a result tree for each of the identified instances of the item at the root of the request tree. Each of the result trees has a structure that resembles the structure of the request tree. For example, based on the request tree in the previous example, the query engine may obtain the following result trees:

```
→ ((George purchased apple) for $0.50)
    ← (George purchased apple)
        $ George
        $ apple
    $ $0.50
→ ((Sally purchased orange) for $0.45)
    ← (Sally purchased orange)
        $ Sally
        $ orange
    $ $0.45
```

In these, and other result trees used below, name values of instances are denoted using the "$" symbol.

In some embodiments, device 2 includes a dataset storage module 6 to store one or more multidimensional datasets generated by database adapter 10 for subsequent reuse. Associative database module 4 and dataset storage module 6 may be stored in single storage media within device 2, such as a hard disk drive, random access memory, and so on. In other embodiments, associative database module 4 and dataset storage module 6 may be stored remotely.

The invention may provide one or more advantages. For example, associative databases may offer several advantages over conventional relational databases. For instance, because associative databases may store data types in terms of entities and relations rather than sets of tables, it may be easier for database administrators to merge or otherwise manipulate multiple databases. In addition, associative databases may simplify application programming by abstracting away the logical structure of the database. Abstracting away the logical structure of the database may increase reusability and decrease application maintenance costs. This invention may allow administrators to exploit the advantages of associative databases, yet provide fully-functional, complex enterprise software applications that manipulate multidimensional data.

Figure 2:
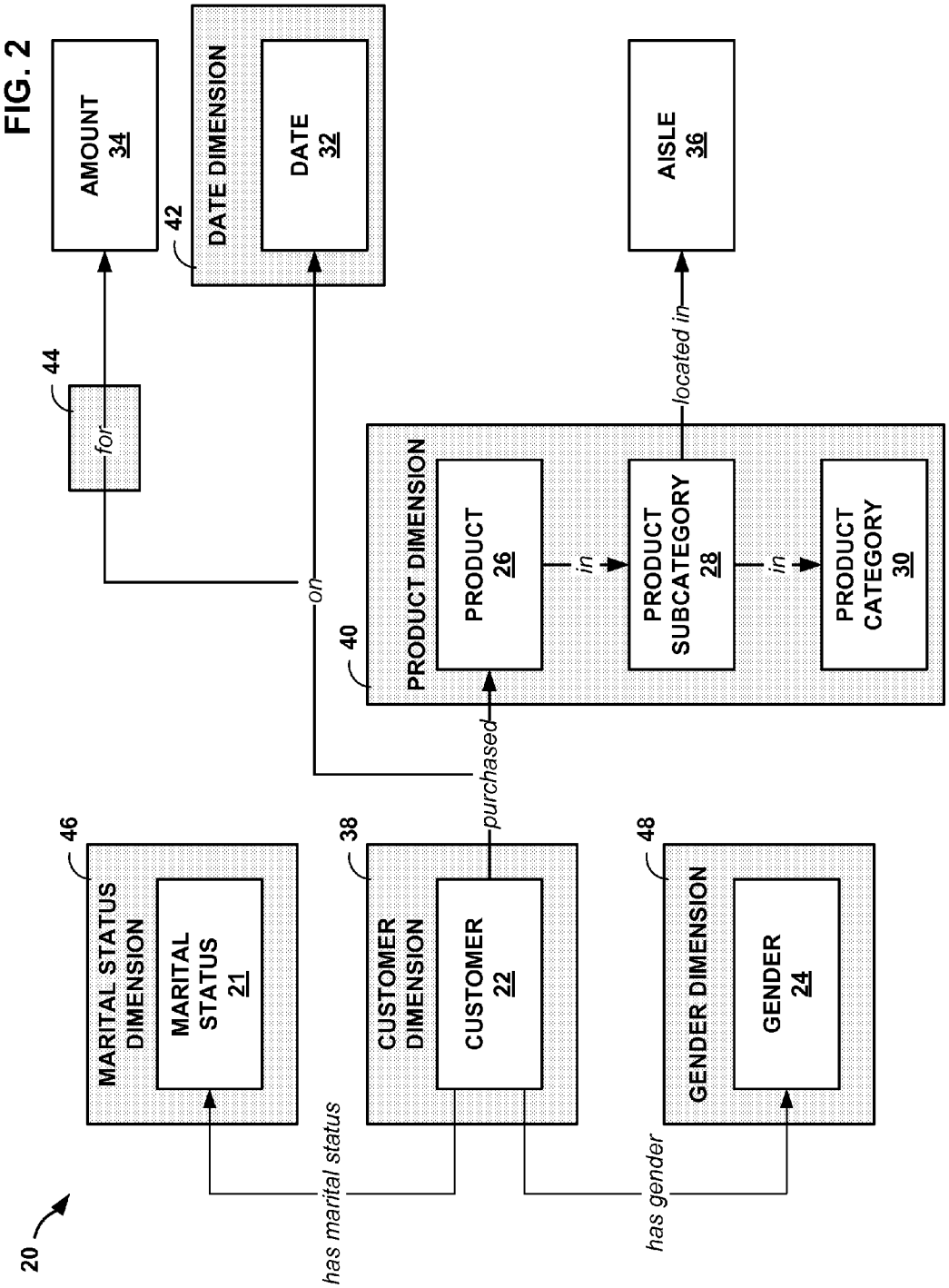
FIG. 2 is a block diagram illustrating an exemplary schematic graph of an associative database.

FIG. 2 is a block diagram illustrating an exemplary schematic graph 20 of an associative database, such as the associate database maintained by associative database module 4 of FIG. 1. Graph 20 illustrates a schematic view of entities and relations between entities within the database. For purposes of illustration, entities are represented using blocks, and relations are represented using arrows.

Graph 20 includes a marital status entity 21, a customer entity 22, a gender entity 24, a product entity 26, a product subcategory entity 28, a product category entity 30, a date entity 32, an amount entity 34, and an aisle entity 36. An associative database may include many instances for each of the entities. For example, an associative database may include an instance of customer entity 22 with a name "$ George", an instance of customer entity 22 having a name "$ Sally", and so on.

Graph 20 includes several relations. For instance, graph 20 includes a relation "(Product in Product Subcategory)" from product entity 26 to product subcategory entity 28. Graph 20 also includes a relation "(Product Subcategory in Product Category)" from product subcategory entity 28 to product category entity 30. Thus, an instance of product entity 26 is "in" an instance of product subcategory 28 which is "in" an instance of product category 30. Furthermore, graph 20 includes a relation "(Product Subcategory located in Aisle)" from product subcategory schema 28 to aisle category 36. Graph 20 includes a relationship "(Customer purchased Product)" from customer entity 22 to product entity 26. Graph 20 also includes a relation "((Customer purchased Product) for Amount)" from the "(Customer purchased Product)" relation to amount entity 34. In addition, graph 20 includes a relation "((Customer purchased Product) for Amount) on Date)" from the relation ((Customer purchased Product) for Amount) to date entity 32. Graph 20 also includes a relation "(Customer has marital status Marital Status)" from customer entity 22 to marital status entity 21. Furthermore, graph 20 includes a relation "(Customer has gender Gender)" from customer entity 22 to gender entity 22.

Graph 20 illustrates a customer dimension 38, a product dimension 40, a date dimension 42, a marital status dimension 46, and a gender dimension 48. Customer dimension 38, product dimension 40, date dimension 42, marital status dimension 46, and gender dimension 48 represent entities of the associative database specified by user 12 as dimensions of a multidimensional dataset. In this case, the multidimensional dataset has five dimensions. Name values of instances of customer entity 22 may serve as index values one dimension of the multidimensional dataset. Name values of instances of date entity 32 may serve as index values along another dimension of the multidimensional dataset, and so on.

In addition, graph 20 illustrates a measure relation 44. Measure relation 44 is a relation that specifies the measure entity. As illustrated in the example of FIG. 2, user 12 has designated the relation "((Customer purchased Product) for Amount)" as the measure relations. In this case, amount entity 34 may be the measure entity.

Graph 20 also illustrates that a multidimensional dataset does not necessarily include all entities in an associative database. For example, user 12 has not designated aisle entity 36 as one of the dimension of the multidimensional dataset or as the measure entity.

Figure 3:
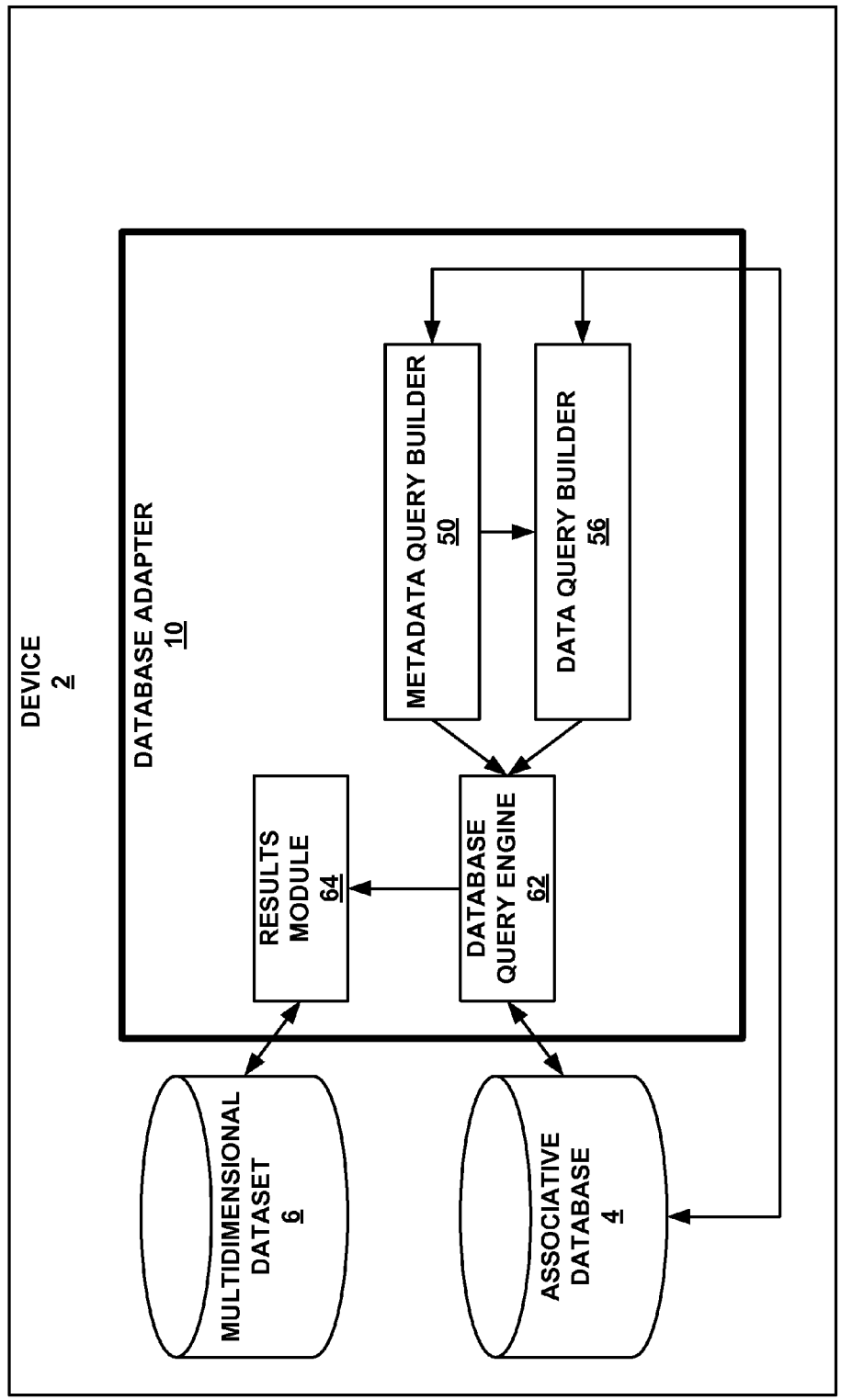
FIG. 3 is a block diagram illustrating an exemplary device that may implement one or more embodiments of the invention.

FIG. 3 is a block diagram illustrating exemplary device 2 that may include one or more embodiments of the invention. As illustrated in the example of FIG. 2, device 2 includes associative database module 4, dataset storage module 6, and database adapter 10. In addition, database adapter 10 includes a metadata query builder 50, a data query builder 56, a database query engine 62, and a results module 64.

Initially, enterprise software system 8 provides database adapter 10 with input that specifies a measure relation in an associative database in associative database module 4 and a set of entities in the associative database from which index values for dimensions of a multidimensional dataset may be derived. When database adapter 10 receives the input, metadata query builder 50 generates queries to identify instances of entities from which index values for the dimensions may be derived. After metadata query builder 50 generates a query for each of the dimensions, data query builder 56 generates a query to identify instances of a measure entity from which measure values may be derived and instances of entities from which metadata for the measure values may be derived. Database query engine 62 may then apply the queries to the associative database to obtain result trees containing the items identified by the queries. Results module 64 may then derive index values and measure values from the result trees. After deriving index values and measure values, results module 64 uses the derived index values and data values to build the multidimensional dataset.

To generate a query for a dimension of the requested multidimensional dataset, metadata query builder 50 first identifies an entity at the top level of the dimension and adds the entity to a queue. For example, in a query for product dimension 40, metadata query builder 50 may identify product entity 26 as the top level of product dimension 40. After adding the top-level entity to the queue, metadata query builder 50 determines whether the queue contains any items. Because metadata query builder 50 inserted the top-level entity into the queue, the queue contains this entity. If the queue contains an item, metadata query builder 50 may then remove a first item from the head of the queue. This item is referred to herein as the "current item."

After removing the current item from the queue, metadata query builder 50 determines whether the current item is already in a metadata query request tree. If the current item is not yet in the metadata query request tree, metadata query builder 50 adds the current item to the metadata query request tree. If the current item is already in the metadata query request tree, metadata query builder 50 determines whether the queue contains any items, and, if so, removes a new item from the head of the queue for processing as the "current item."

How metadata query builder 50 adds the current item to the metadata query request tree may depend on which items are already in the metadata query request tree. For example, if the metadata query request tree is empty, metadata query builder 50 adds the entity to the metadata query request tree. This entity then serves as the root of the metadata query request tree. However, when the metadata query request tree is not empty, metadata query builder 50 starts at the root of the metadata query request tree and attempts to identify an item in the metadata query request tree that is related to the current item. When metadata query builder 50 identifies an item in the metadata query request tree that is related to the current item, metadata query builder 50 inserts the current item below the identified item. For example, "(Product in Subcategory)" may be the current item and the following may be the current metadata query request tree:

Product

In this case, metadata query builder 50 starts at the root of the metadata query request tree "(# Product)" and attempts to identify an item in the metadata query request tree that is related to "(Product in Subcategory)". Because "# Product" is related to "(Product in Subcategory)," metadata query builder 50 adds "(Product in Subcategory)" below "# Product." After adding "(Product in Subcategory)" below "# Product," the following may be the current metadata query request tree:

Product
→ (Product in Subcategory)

In this example metadata query request tree, the right arrow (→) denotes a relation that is a target of a higher-level relation or a relation that specifies a higher-level entity as a source. If the above metadata query request tree is the current metadata query result tree and the current item is "# Subcategory", metadata query builder 50 starts with "# Product". Because "# Subcategory" is not related to "# Product", metadata query builder 50 moves on to "(Product in Subcategory)". Because "# Subcategory" is related to "(Product in Subcategory)", metadata query builder 50 adds "# Subcategory" below "(Product in Subcategory)". Thus, the following may be the current metadata query request tree:

Product
→ (Product in Subcategory)
Subcategory

If the current item is a relation and another relation already in the metadata query request tree specifies the current item as a source, metadata query builder 50 adds the current item below the relation already in the metadata query request tree. However, metadata query builder 50 may indicate that this is an "inverse relation" by using a left arrow (←). For example, suppose the current item is "(Customer purchased Product)" and the following represent the current query request tree:

((Customer purchased Product) on Date)

In this case, metadata query builder 50 may determine that the current item is the source of "((Customer purchased Product) on Date)." Accordingly, metadata query builder 50 adds the current item below "((Customer purchased Product) on Date)", but with a left arrow. Thus, after adding the current item, the following may be the current query request tree:

((Customer purchased Product) on Date)
← (Customer purchased Product)

After adding the current item to the metadata query request tree, metadata query builder 50 determines whether the current item is a relation or an entity. If the current item is a relation, metadata query builder 50 adds items from both ends of the relation to the queue. For example, if "(Product Subcategory in Product Category)" is the current item, metadata query builder 50 adds the items "Product Subcategory" and "Product Category" to the queue. After adding the items from both ends of the relation to the queue, metadata query builder 50 determines whether the queue contains any items. If so, metadata query builder 50 removes another item from the head of the queue.

On the other hand, if the current item is an entity, metadata query builder 50 determines whether the current item represents the next level of the dimension. Metadata query builder 50 determines that the current item represents the next level of the dimension when the current item represents the level of the dimension immediately lower than the entity labeled "current level." For example, if metadata query builder 50 labeled "# Product Subcategory" the "current level" and "# Product Category" is the current item, then metadata query builder 50 determines that "# Product Category" represents the next level of product dimension 40. If the current item is not the next level of the dimension, metadata query builder 50 determines whether the queue contains any items, and, if so, removes another item from the head of the queue.

If the current item is the next level of the dimension, metadata query builder 50 determines whether the current item represents the last level of the dimension. Metadata query builder 50 determines that the current entity represents the last level of the dimension when there are no levels of the dimension lower than the level represented by the current item. For example, if the current item is "# Product Category", metadata query builder 50 determines that the current item is the last level of product dimension 40. If the current item does not represent the last level of the dimension, metadata query builder 50 adds all relations to and from the current item to the queue and labels the current item as the "current level." Metadata query builder 50 may then determine whether the queue contains any items, and, if so, remove a new item from the queue, and so on. For example, if "# Product Subcategory" is the current item, metadata query builder 50 labels "# Product Subcategory" as the "current level" entity and adds the relations "(Product in Product Subcategory)", "(Product Subcategory located in Aisle)", and "(Product Subcategory in Product Category)" to the queue.

On the other hand, if the current item is the last level of the dimension, metadata query builder 50 prunes any relations from the metadata query request tree that do not link to the levels of the dimension. For example, if metadata query builder 50 had added the relation "(Product Subcategory located in Aisle)" to the metadata query request tree, metadata query builder 50 prunes this relation out of the metadata query request tree because "Aisle" is not in product dimension 40.

After pruning relations from the metadata query request tree that do not link to the levels of the dimension, metadata query builder 50 may determine whether to specify that the metadata query request tree includes a recursive closure on an entity in the metadata query request tree. If metadata query builder 50 specifies that the metadata query request tree includes a recursive closure for an entity in the metadata query request tree, metadata query builder 50 is instructing database query engine 62 to recursively identify instances of the entity in a chain of instances of the entity related by instances of the same relation. For example, an associative database may describe the ancestry of a person using the relation "Person is parent of Person". Because this relation describes an association between two of the same type of entities, the associative database may contain chains of such relations. For example, the associative database may contain the chain, "$ George is parent of $ Sally is parent of $ Richard." A chain may terminate when the instance of the person entity specified as a source is the same instance of the person entity specified as the target by the relation. For instance, a chain may terminate when "$ George is a parent of $ George". By applying recursive closure to a "# Person" entity in the query, database query engine 62 retrieves all linear ancestors of a "# Person" entity.

After applying recursive closure if needed, metadata query builder 50 may provide the metadata query request tree to database query engine 62 and data query builder 56. For example, metadata query builder 50 may generate the following metadata query request tree for product dimension 40:

Product
   → (Product in Product Subcategory)
      # Product Subcategory
         → (Product Subcategory in Product Category)
         # Product Category Upon receiving the metadata query request tree, database query engine 62 may then perform a query described by the metadata query request tree. When database query engine 62 performs the query described by the metadata query request tree described in the previous example, database query engine 62 may obtain the following set of result trees:

$ Salmon
   → in Fish
      $ Fish
         → in Food
         $ Food
$ Tuna
   → in Fish
      $ Fish
         → in Food
         $ Food
$ Milk
   → in Dairy
      $ Dairy
         → in Beverage
         $ Beverage In this example result tree, "$ Salmon", "$ Tuna", and "$ Milk" are name values of instances of product entity 26, "$ Fish" and "$ Dairy" are instances of product subcategory 28, and "$ Food" and "$ Beverage" are instances of product category 30.

To convert the results to the multidimensional data model, results module 64 may parse a set of result trees to derive index values for a given dimension. Results module 64 may then sort the index values in one or more ways. For example, if index values in the result set are strings, database query engine 62 may sort the result values alphabetically. If the result tree contains more than one level, as would be the case in a query for a dimension with more than one level, results module 64 takes each lowest-level result and concatenates the result for the next-higher level to the end of the lowest-level result. Results module 64 may then continue to concatenate progressively higher results to the beginning of a result value. In this way, results module 64 may create an index value that captures the result values of each of the levels of the dimension. For instance, given the above set of result trees for product dimension 40, results module 64 may derive the following index values for product dimension 40:

Food / Fish / Salmon
Food / Fish / Tuna
Beverage / Dairy / Milk

In these index values the symbol "/" is a separator to indicate levels of a dimension. After deriving the index values for a dimension, results module 64 may insert the index values into the multidimensional dataset.

After database query engine 62 inserts the index values into the multidimensional dataset, data query builder 56 may create a query that identifies data values of the multidimensional dataset. To create a query that identifies data values of the multidimensional dataset, data query builder 56 adds the relation in the associative database designated as the measure relation to a data query request tree. Data query builder 56 adds items to the data query request tree in the same manner that metadata query builder 50 adds items to a metadata query request tree. For example, in graph 20, data query builder 56 adds measure relation 44 "(((Customer purchased Product) on Date) for Amount)" to the data query request tree.

After adding the measure relation to the data query request tree, data query builder 56 may then determine which end of the measure relation specifies the measure entity. As discussed above, the measure identity is an entity specified by the measure relation whose instances have name values from which measure values may be derived. For instance, data query builder 56 may determine that amount entity 34 is the measure entity. After determining which end of the measure relation specifies the measure entity, data query builder 56 adds the measure entity to the data query request tree. For example, data query builder 56 may add the entity "# Amount" to the data query. At this point, the data query may appear as follows:

---
(((Customer purchased Product) on Date) for Amount)
 # Amount
---

Once data query builder 56 has added the measure entity to the data query, data query builder 56 inserts the item from the other end of the measure relation into a queue. For example, in graph 20, data query builder 56 may insert the item "((Customer purchased Product) on Date)" into the queue. After inserting the item into the queue, data query builder 56 removes an item from the head of the queue. The item removed from the head of the queue is referred to herein as the "current item." Data query builder 56 then determines whether the current item is already in the data query request tree. If the current item is already in the data query request tree, data query builder 56 takes a new item from the head of the queue and determines whether this new item is already in the data query request tree, and so on. On the other hand, if the current item is not already in the data query request tree, data query builder 56 adds the current item to the data query request tree. Continuing the previous example, data query builder 56 may remove the item "((Customer purchased Product) on Date)" from the queue and determine that this item is not already in the data query request tree. After adding the item "((Customer purchased Product) on Date)" to the data query request tree, the data query request tree may appear as follows:

---
(((Customer purchased Product) on Date) for Amount)
 ← ((Customer purchased Product) on Date)
   # Amount
---

Note that the item "((Customer purchased Product) on Date)" is preceded by a left arrow "←" because the item "((Customer purchased Product) on Date)" is a source item of the previous item.

After data query builder 56 adds the current item to the data query, data query builder 56 determines whether the current item is a relation or an entity. For instance, data query builder 56 determines that "((Customer purchased Product) on Date)" is a relation rather than an entity. If the current item is a relation, data query builder 56 adds items from both ends of the relation to the end of the queue. For instance, if the current item is "((Customer purchased Product) on Date)", data query builder 56 adds the items "(Customer purchased Product)" and "# Date" to the queue. Data query builder 56 then takes another new item from the head of the queue, determines whether the new item is already in the data query request tree, and so on.

If the current item is an entity, data query builder 56 determines whether the entity is the highest level of a dimension. Data query builder 56 may determine that the entity is the highest level of a dimension when there are no entities that are specified as higher levels of the dimension. If the entity is not the highest level of the dimension, data query builder 56 adds all relations to or from the entity to the end of the queue. Data query builder 56 then removes another new item from the head of the queue, determines whether the new item is already in the data query request tree, and so on. If the entity is the highest level of a dimension, data query builder 56 adds the metadata query request tree built by metadata query builder 50 for the dimension to fill in the rest of the query for the dimension. For example, if the current item is "# Product", this item is the highest item of product dimension 40. In this case, data query builder 56 may add the query request tree described above to the data query request tree. The following may be the data query request tree after adding the metadata query request tree for product dimension 40:

---
(((Customer purchased Product) on Date) for Amount)
 ← ((Customer purchased Product) on Date)
   ← (Customer purchased Product)
     # Product
       → (Product in Product Subcategory)
         # Product Subcategory
           → (Product Subcategory in Product Category)
             # Product Category
   # Amount
---

After adding a metadata query request tree to the data query request tree, data query builder 56 determines whether the queue is empty. If the queue is not empty, data query builder 56 removes a new item from the head of the queue, determines whether the data query request tree already contains the item, and continues the process. Otherwise, if the queue is empty, data query builder 56 prunes any relations in the data query request tree that do not link to levels or measures. In other words, data query builder 56 removes items from the data query request tree that user 12 did not designate should be in the multidimensional dataset. After pruning the data query request tree, data query builder 56 provides the data query request tree to database query engine 62.

At the end of the process, data query builder 56 may have generated the following data query request tree to identify instances of the measure entity and associated metadata for each of the specified dimensions of a multidimensional dataset:

---
(((Customer purchased Product) on Date) for Amount)
 ← (Customer purchased Product) on Date)
   ← (Customer purchased Product)
     # Customer
---

-continued

```
        → (Customer has gender Gender)
            # Gender
        → (Customer has Marital Status)
            # Marital Status
    # Product
        → (Product in Product Subcategory)
            # Product Subcategory
                → (Product Subcategory in Product Category)
                    # Product Category
    # Date
    # Amount
```

In one example, based on this data query, database query engine 62 may obtain the following set of result trees:

```
→ (((George purchased Salmon) on 7.21.2005) for $7.00)
    ← (George purchased Salmon) on 7.21.2005)
        ← (George purchased Salmon)
            $ George
                → (George has gender Male)
                    $ Male
                → (George has marital status Married)
                    $ Married
            $ Salmon
                → (Salmon in Canned Food)
                    $ Canned Food
                        → (Canned Food in Food)
                            $ Food
        $ 7.21.2005
    $ $7.00
→ ((Sally purchased Tuna) on 7.25.2005) for $5.00)
    ← (Sally purchased Tuna) on 7.25.2005)
        ← (Sally purchased Tuna)
            $ Sally
                → (Sally has gender Female)
                    $ Female
                → (Sally has marital status Single)
                    $ Single
            $ Tuna
                → (Tuna in Canned Food)
                    $ Canned Food
                        → (Canned Food in Food)
                            $ Food
        $ 7.21.2005
    $ $5.00
```

After database query engine 62 obtains a set of result trees, database query engine 62 provides the set of result trees to results module 64. Results module 64 may parse the set of result trees to obtain all the information necessary to insert data values into a multidimensional dataset in the correct cells. For instance, results module 64 may parse the first one of the result trees above to place "$7.00" at a cell in the multidimensional dataset identified by "George" in customer dimension 38, "Food/Canned Food/Salmon" in product dimension 40, "7.21.2005" in date dimension 42, "Married" in marital status dimension 46, and "Male" in gender dimension 48.

In one embodiment, results module 64 stores the multidimensional dataset in the form of one or more B-Trees. For instance, results module 64 may determine multidimensional tuples associated with the multidimensional data space. Each multidimensional tuple represents a unique respective multidimensional element with the multidimensional data space.

Figure 4:
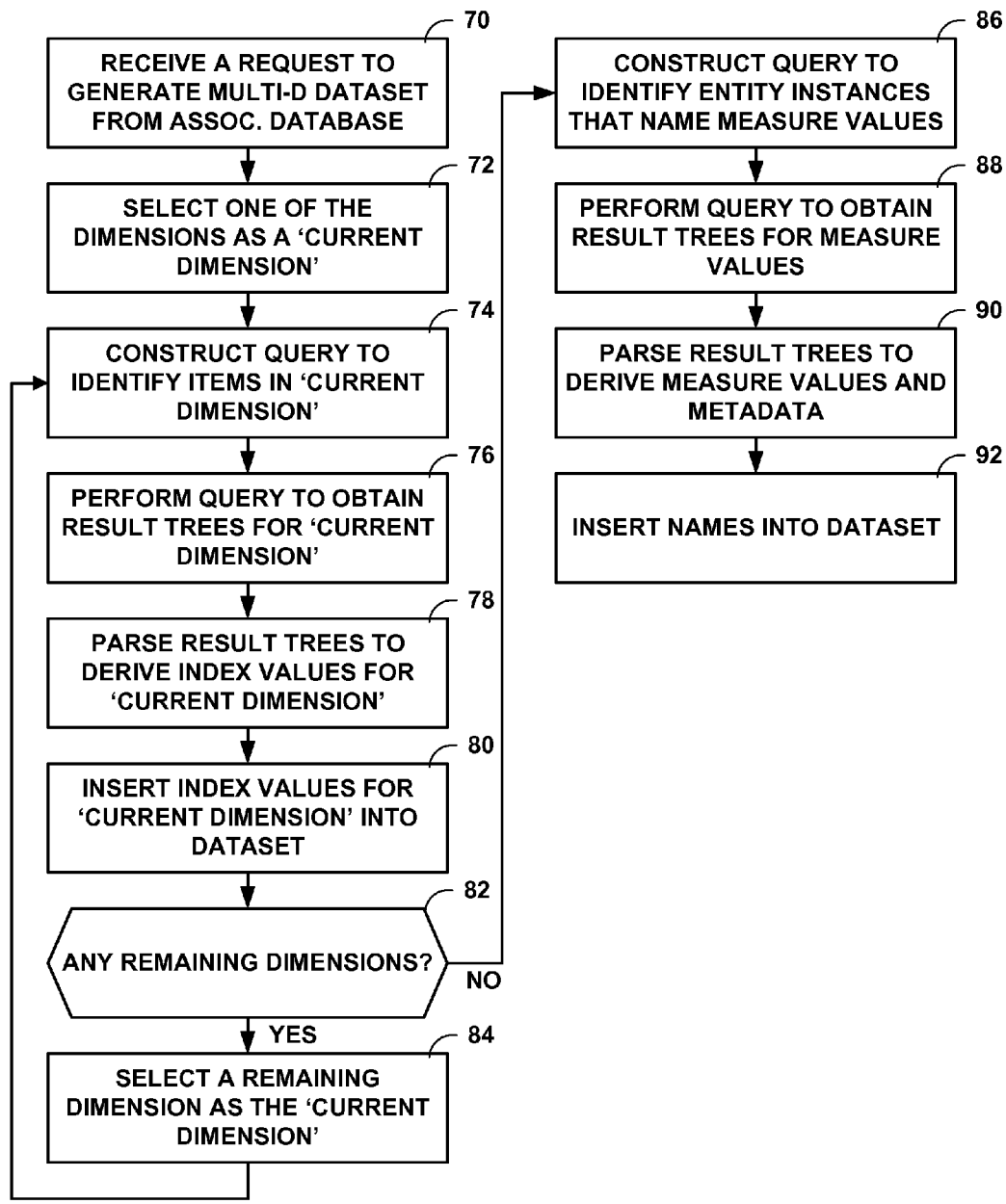
FIG. 4 is a flowchart illustrating an exemplary operation of a database adapter to generate a multidimensional dataset from an associative database.

FIG. 4 is a flowchart illustrating an exemplary operation of a database adapter to generate a multidimensional dataset from an associative database. Initially, database adapter 10 receives a request to generate a multidimensional dataset from one or more associative databases in associative database module 4 (70). The request may specify a plurality of dimensions or, in some embodiments, database adapter 10 may identify a plurality of dimensions from the query. After receiving the request, metadata query builder 50 selects one of the dimensions as a "current dimension" (72). Metadata query builder 50 then constructs a query to identify entity instances in the associative database from which index values of the "current dimension" may be derived (74). After metadata query builder 50 constructs the query for the "current dimension," database query engine 62 performs the query to obtain a result tree containing names of the entity instances of the associative database identified by the query (76). Results module 64 may then parse the result tree to derive index values for the "current dimension" (78). In some embodiments, results module 64 may sort the index values at this point. After sorting the names, results module 64 may insert the index values into the multidimensional dataset as the index values of the "current dimension" (80). If there are any remaining dimensions ("YES" of 82), metadata query builder 50 selects one of the remaining dimensions as the "current dimension" (84). After selecting one of the remaining dimensions, metadata query builder 50 constructs a query to identify entity instances of the new "current dimension" (74), and so on.

On the other hand, if there are no remaining dimensions ("NO" of 82), data query builder 56 constructs a query to identify entity instances of the associative database having name values from which measure values and associated metadata for each of the dimensions may be derived (86). After data query builder 56 constructs the query, database query engine 62 performs the query on the associative database to obtain a set of result trees (88). Results module 64 may then parse the set of result trees to derive measure values and, for each of the measure values, an index value in each of the dimensions of the multidimensional dataset (90). Results module 64 may then insert the measure values into cells of the multidimensional dataset identified by the index values (92).

Figure 5:
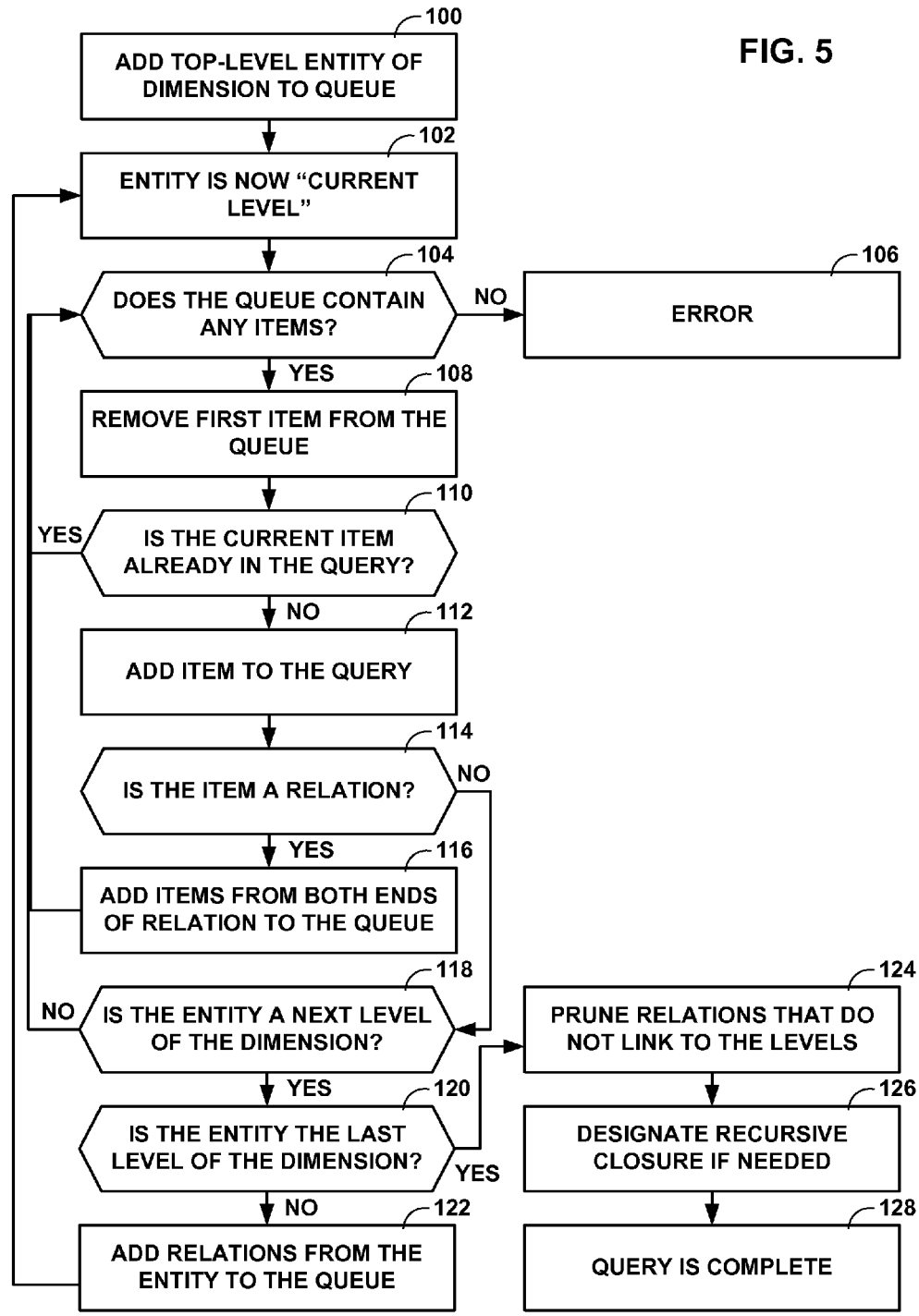
FIG. 5 is a flowchart illustrating an exemplary operation of database adapter 10 to build a query to identify instances of one or more entities in an associative database for association with a dimension of the multidimensional dataset being formed.

FIG. 5 is a flowchart illustrating an exemplary operation of database adapter 10 to build a query to identify instances of one or more entities in an associative database for association with a dimension of the multidimensional dataset being formed. Metadata query builder 50 starts a metadata query by adding a top-level entity of a dimension to a queue (100). Metadata query builder 50 references the top-level entity of a dimension as the "current level" (102). Next, metadata query builder 50 begins processing the queue to generate the query. During this process, metadata query builder 50 determines whether the queue contains any items (104). If the queue does not contain any items ("NO" of 104), metadata query builder 50 may generate an error and terminate (106).

If the queue contains one or more items ("YES" of 104), metadata query builder 50 removes a first item from the queue (108). The removed item may be referred to herein as the "current item." After removing the current item from the queue, metadata query builder 50 determines whether the current item is already in the metadata query request tree (110). If the current item is already in the metadata query request tree ("YES" of 110), metadata query builder 50 removes a new current item from the head of the queue (108). If the current item is not already in the metadata query request tree ("NO" of 110), metadata query builder 50 adds the current item to the metadata query request tree (112).

After adding the current item to the metadata query request tree, metadata query builder 50 determines whether the current item is a relation or an entity (114). If the current item is a relation ("YES" of 114), metadata query builder 50 adds items from both ends of the relation to the queue (116). Metadata query builder 50 then determines whether the queue contains any items (104) and, if so, removes another item from the head of the queue (108).

On the other hand, if the current item is an entity ("NO" of 114), metadata query builder 50 determines if the entity represents a next level of the dimension (118). To determine whether the entity represents the next level of the dimension, metadata query builder 50 determines whether the entity is the entity that follows the entity labeled as the "current level". If the entity does not represent the next level of the dimension ("NO" of 118), metadata query builder 50 determines whether the queue contains any items (104) and, if so, removes another item from the head of the queue (108).

If the entity does represent the next level of the dimension, metadata query builder 50 determines whether the entity represents the last level of the dimension (120). If metadata query builder 50 determines that the entity does not represent the last level of the dimension ("NO" of 120), metadata query builder 50 adds all relations to or from the entity to the queue (122). Metadata query builder 50 may then internally label the entity as the "current level" (102), determine whether the queue contains any items (104), as so on.

On the other hand, if metadata query builder 50 determines that the entity represents the last level of the dimension ("YES" of 120), metadata query builder 50 prunes relations from the metadata query request tree that do not link to other levels in the dimension (124). In other words, metadata query builder 50 removes items in metadata query request tree that are not in the dimension. After pruning relations from the metadata query request tree, metadata query builder 50 designates an entity in the metadata query request tree as having recursive closure (126). As discussed above, designating an entity has having recursive closure instructs query processing engine 62 to find all instances of an entity in a chain of instances related by a common relation. Metadata query builder 50 may then notify query processing engine 62 that the metadata query request tree is complete (128).

Figure 6:
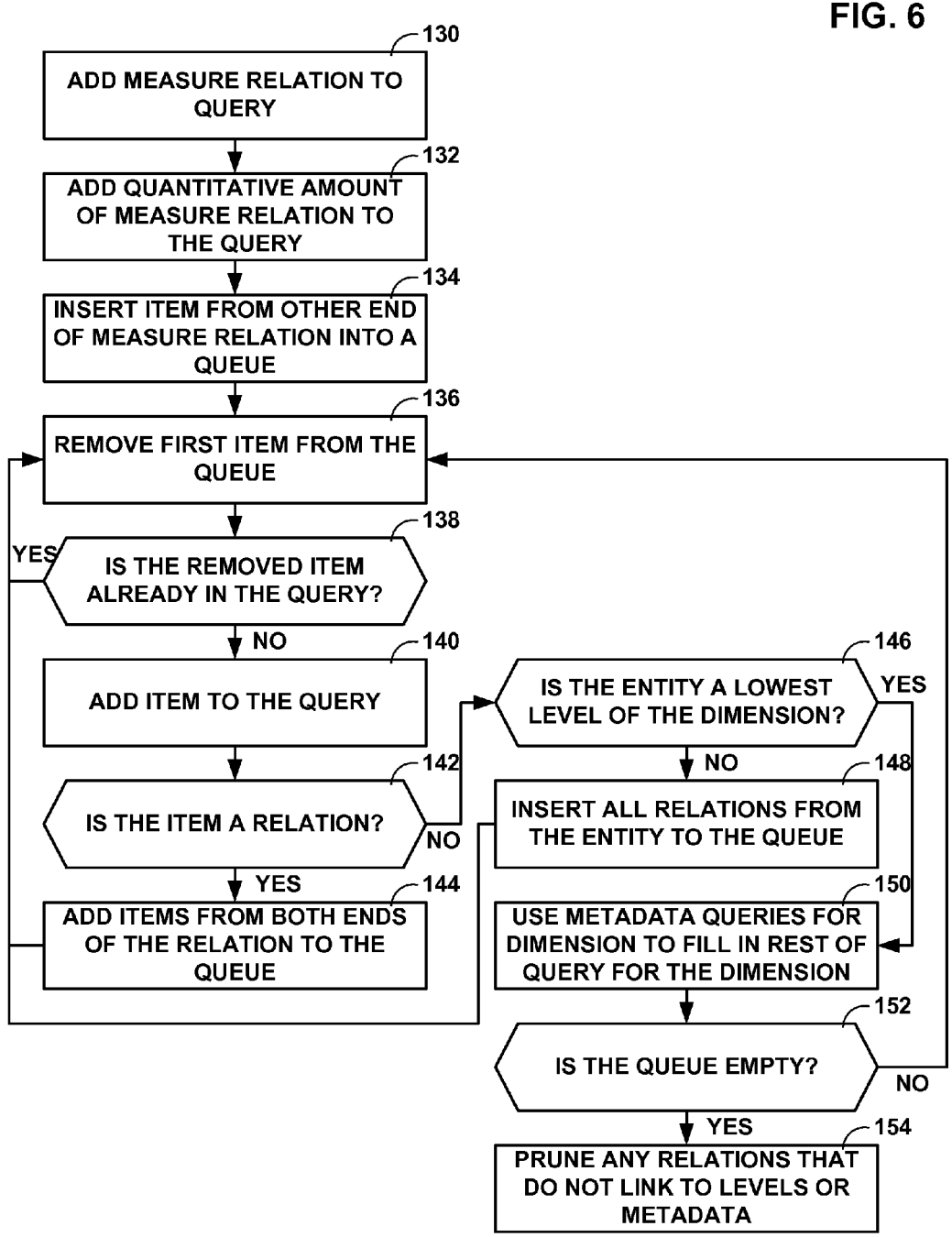
FIG. 6 is a flowchart illustrating an exemplary operation of database adapter 10 to build a query to identify instances of the measure entity and associated metadata when generating the multidimensional data.

FIG. 6 is a flowchart illustrating an exemplary operation of database adapter 10 to build a query to identify instances of the measure entity and associated metadata when generating the multidimensional data. Initially, data query builder 56 locates the designated measure relation and adds the measure relation to a data query request tree (130). After adding the measure relation to the data query request tree, data query builder 56 determines which end of the measure relation is the measure entity and adds the measure entity to the data query request tree (132).

Once data query builder 56 has added the measure entity to the data query request tree, data query builder 56 may add the item from the other end of the measure relation to a queue (134). Data query builder 56 then removes an item from the head of the queue (136). The removed item may be referred to herein as the "current item."

After removing the current item from the head of the queue, data query builder 56 determines whether the current item is already in the data query request tree (138). If the current item is already in the data query request tree ("YES" of 138), data query builder 56 removes another item from the head of the queue (136). On the other hand, if the current item is not already in the data query request tree ("NO" of 138), data query builder 56 adds the current item to the data query request tree (140).

Data query builder 56 then determines whether the current item is a relation or an entity (142). If the item is a relation ("YES" of 142), data query builder 56 adds items from both ends of the relation to the queue (144). After adding items from both ends of the relation to the queue, data query builder 56 removes a new current item from the head of the queue (136).

On the other hand, if current item is an entity ("NO" of 142), data query builder 56 determines whether the entity is a lowest level of a dimension (146). If data query builder 56 determines that the entity is not a lowest level of a dimension ("NO" of 146), data query builder 56 inserts all relations from the entity into the queue (148).

If data query builder 56 determines that the entity is a lowest level of a dimension ("YES" of 146), data query builder 56 adds a metadata query request tree for the dimension to fill in the rest of the data query request tree for the dimension (150). After adding the metadata query request tree to the data query request tree, metadata query builder 50 determines whether the queue is empty (152). If the queue is not empty ("NO" of 152), data query builder 50 removes a new current item from the queue (136) and repeats the process. On the other hand, if the queue is empty ("YES" of 152), data query builder 56 prunes any relations from the data query request tree that do not link to levels or metadata (154).

Figure 7:
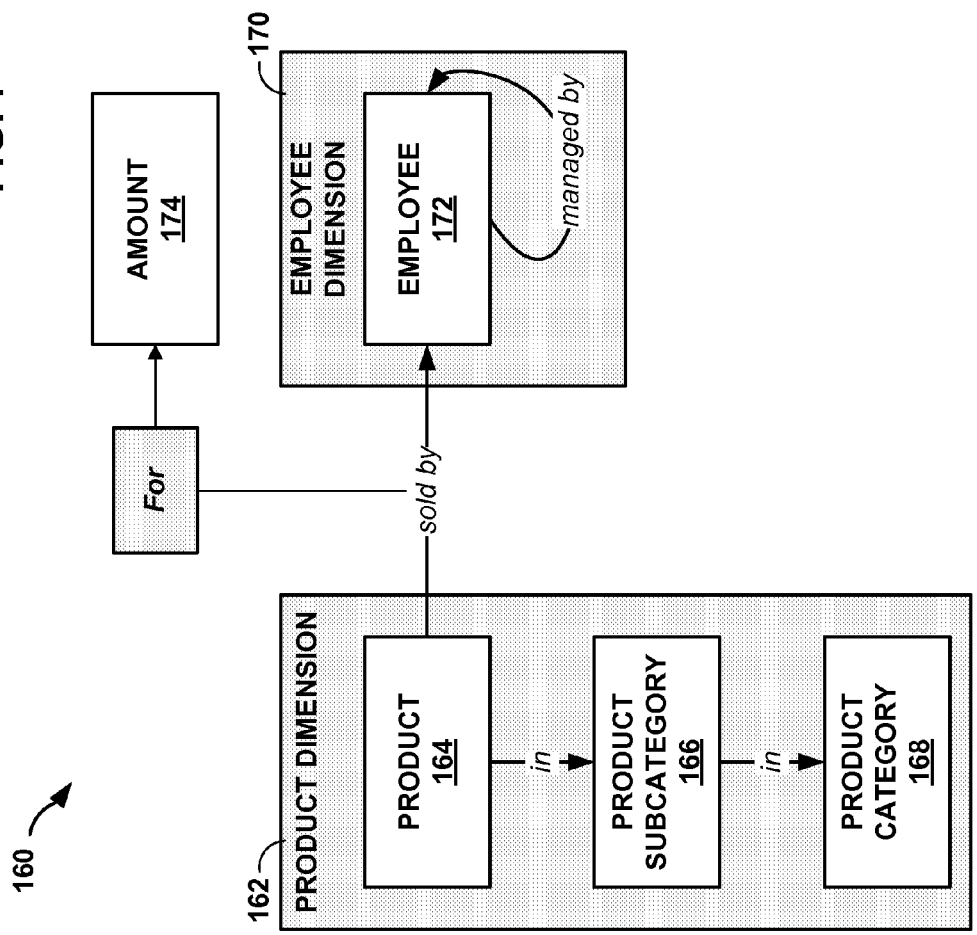
FIG. 7 is a block diagram illustrating an exemplary schematic graph of an associative database in which recursive closure may be applied.

FIG. 7 is a block diagram illustrating an exemplary schematic graph 160 of an associative database in which recursive closure may be applied. In graph 160, user 12 has specified a product dimension 162. Product dimension 162 is similar to product dimension 40 in that product dimension 162 contains a product entity 164, a product subcategory entity 166, and a product category entity 168.

In graph 160, user 12 has also specified an employee dimension 170. Employee dimension 170 includes an employee entity 172. A relation "(Product sold by Employee)" specifies product entity 164 as a source and employee entity 172 as a target. Thus, the relation describes the idea that a product was sold by an employee.

User 12 has also included in graph 160 a relation "(Employee managed by Employee)" having employee entity 172 as both a source and as a target. This relation describes idea that an employee is managed by an employee. By including this relation in graph 160, user 12 specifies that employee dimension 170 may include multiple levels of instances of employee entity 172. For this reason, metadata query builder 50 may apply recursive closure to employee entity 172 when creating a query for employee dimension 170.

Different employees may have different numbers of other employees who manage them. For example, a mail clerk may be "managed by" by another employee, who may be managed by a third employee, and so on up the corporate hierarchy to the corporate president. At the same time, a president of a corporation may not be "managed by" anyone in the corporate hierarchy. In this case, an employee instance representing the president may have a "managed by" relation instance that specifies the president's employee instance as a source and as a target.

Furthermore, user 12 has designated a relation "((Product sold by Employee) for Amount)" as a measure relation. An amount entity 174 serves as the measure entity.

Figure 8:
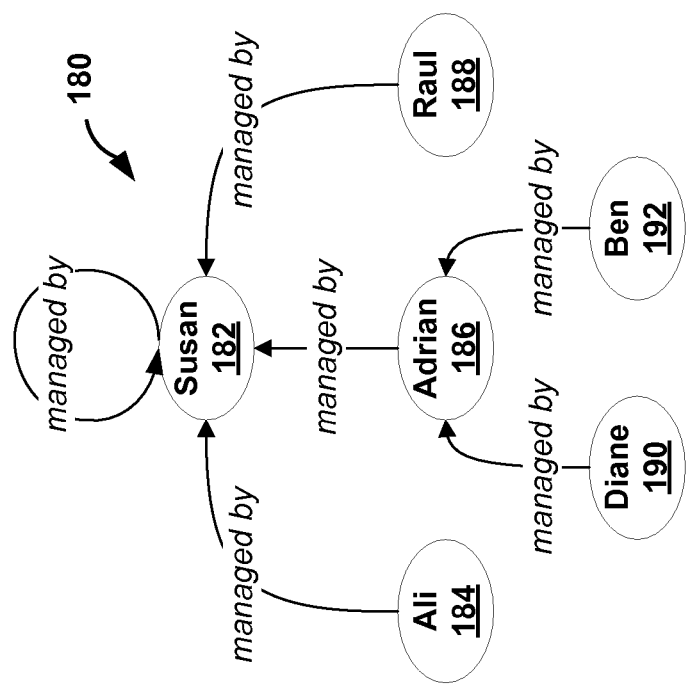
FIG. 8 is a block diagram illustrating an exemplary graph of entity instances and relation instances in an associative database to which recursive closure may be applied.

FIG. 8 is a block diagram illustrating an exemplary graph 180 of entity instances and relation instances in an associative database to which recursive closure may be applied. Graph 180 illustrates employee entity instances and relation instances that may be in an associative database in associative database module 4. Graph 180 includes an instance 182 of employee entity 172 having the name value "$ Susan", an instance 184 of employee entity 172 having the name value "$ Ali", an instance 186 of employee entity 172 having the name value "$ Adrian", an instance 188 of employee entity 172 having the name value "$ Raul", an instance 190 of employee entity 172 having the name value "$ Diane", and an instance 192 of employee entity 172 having the name value "$ Ben".

In graph 180, entity 190 ("Diane") is managed by entity 186 ("Adrian"). Entity 192 ("Ben") is managed by entity 186 ("Adrian"). Entity 184 ("Ali") is managed by entity 182 ("Susan"). Entity 186 ("Adrian") is managed by entity 182 ("Susan"). Entity 188 ("Raul") is managed by entity 182 ("Susan"). Entity 182 ("Susan") is managed by entity 182 ("Susan").

Because metadata query engine 50 may apply recursive closure to employee entity 172, database query engine 162 may obtain the following set of result trees for employee dimension 170 from an associative database containing graph 180:

```
$ Susan
    → managed by Susan
        $ Susan
$ Ali
    → managed by Susan
        $ Susan
$ Adrian
    → managed by Susan
        $ Susan
$ Raul
    → managed by Susan
        $ Susan
$ Diane
    → managed by Adrian
        $ Adrian
            → managed by Susan
                $ Susan
$ Ben
    → managed by Adrian
        $ Adrian
            → managed by Susan
                $ Susan
```

Results module 64 may parse this set of result trees to obtain the following index values for employee dimension 170:

```
Susan
Susan / Ali
Susan / Adrian
Susan / Raul
Susan / Adrian / Diane
Susan / Adrian / Ben
```

These index values also illustrate that different index value in the same dimension may include different numbers of levels.

Various embodiments of the invention have been described. These and other embodiments are within the scope of the following claims.

The invention claimed is:

1. A computer-implemented method comprising:
automatically generating, by a computer, a multidimensional dataset from an associative database, wherein the multidimensional dataset includes one or more measure values and a plurality of dimensions, and wherein the associative database conforms to an associative model of data, wherein the associative model defines two types of items: (1) entities, each of the entities comprising one or more entity instances, each of the entity instances comprising a discrete item with independent existence; and (2) relation instances that each specify a link between exactly three instances: a source instance, a verb instance, and a target instance, wherein the source instance comprises a first one of the entity instances or a first one of the relation instances, and wherein the target instance comprises a second one of the entity instances or a second one of the relation instances;
performing, by the computer, one or more operations on the multidimensional dataset; and
outputting a result from the operations on the multidimensional dataset.

2. The method of claim 1,
wherein the associative database stores data in two basic types of items in accordance with the associative model: entity instances and relation instances, and
wherein the relation instances describe associations between exactly three items of the associative database.

3. The method of claim 2,
wherein each of the entity instances includes a unique identifier, a name, and a type; and
wherein each relation instance includes a unique identifier, a source identifier, a verb identifier, and a target identifier.

4. The method of claim 1, wherein generating a multidimensional dataset comprises:
extracting metadata from the associative database for each of the dimensions of the multidimensional dataset; and
extracting measure values from the associative database for cells in the multidimensional dataset.

5. The method of claim 4, wherein extracting metadata comprises:
for each of the dimensions, constructing a query to identify item instances in the associative database having names from which the metadata for the dimension are derivable; and
performing the query on the associative database to identify the item instances.

6. The method of claim 5, wherein constructing a query to identify items at the lowest level comprises:
identifying an entity in the associative database at a top-level of the dimension;
adding all relations from the top-level entity to a queue;
removing an item from a head of the queue;
determining whether the item is already in the query;
adding the item to the query when the item is not already in the query;
determining whether the item is a relation item or an entity item;
adding items from both ends of the item to the queue when the item is a relation;
determining whether the item represents a next level of the dimension when the item is an entity item;
determining whether the item represents a last level of the dimension when the item is an entity item and when the item represent the next level of the dimension; and
pruning items from the query that do not link to levels of the dimension when the item represents the last level of the dimension.

7. The method of claim 5,
wherein constructing a query comprises specifying recursive closure on an entity in the query; and
wherein performing the query comprises recursively identifying instances of the entity on which recursive closure was specified in a chain of instances of the entity related by instances of a same relation.

8. The method of claim 5,
wherein constructing a query comprises building a request tree for the dimension; and wherein performing the query on the associative database comprises obtaining a result tree containing the metadata for the dimension.

9. The method of claim 8, wherein the method further comprises:
deriving a set of index values for the dimension from the result tree; and
using the set of index values as the metadata of the dimension in the multidimensional dataset.

10. The method of claim 8, wherein levels of the request tree represents levels of the dimension.

11. The method of claim 4, wherein extracting measure values comprises:
constructing a query to identify item instances in the associative database having name values from which measure values are derivable and, for each of the identified item instances, item instances from which metadata for the measure values are derivable; and
performing the query on the associative database to obtain the item instances from which measure values are derivable and the metadata for the measure values are derivable.

12. The method of claim 11, wherein constructing a query comprises:
adding a measure relation to the query;
adding to the query a measure entity specified by the measure relation whose entity instances have name values from which measure values may be derived;
adding to a queue an item specified by the measure relation other than the measure entity;
removing an item from a head of the queue;
determining whether the item is already in the query;
adding the item to the query when the item is not already in the query;
determining whether the item is a relation item or a measure item;
adding, when the item is a relation item, to the queue an item specified by the item as source item and an item specified by the item as target item;
determining whether the item represents a lowest level of a dimension when the item is an entity item;
adding to the queue relations that specify the item as a source item or as a target item when the item does not represent the lowest level of the dimension;
adding to the query a query that identifies metadata for the dimension when the item represents the lowest level of the dimension;
determining whether the queue is empty; and
pruning from the query relations that do not link to levels of the dimension or measures.

13. The method of claim 11,
wherein constructing a query to identify item instances from which measure values are derivable comprises constructing a request tree; and
wherein performing the query comprises obtaining result trees containing the item instances from which measure values are derivable and the item instances from which metadata for the measure values are derivable.

14. The method of claim 4, wherein the method further comprises:
inserting the metadata from each of the dimensions into a multidimensional dataset; and inserting the measure values into cells in the multidimensional dataset.

15. The method of claim 1, wherein the method further comprises:
receiving input that specifies that a plurality of entity items in the associative database represent the dimensions of the multidimensional dataset; and
receiving input that specifies a relation in associative database that specifies an entity in the associative database having entity instances that name measure values for cells of the multidimensional dataset.

16. The method of claim 1, wherein displaying information based on the multidimensional dataset comprises applying On-Line Analytical Processing (OLAP) to the multidimensional dataset.

17. The method of claim 1, wherein the method further comprises storing at least some of the multidimensional dataset in a persistent storage medium.

18. A computing device comprising:
a processor;
an associative database that conforms to an associative model of data, wherein the associative model defines two types of items: (1) entities, each of the entities comprising one or more entity instances, each of the entity instances comprising a discrete item with independent existence; and (2) relation instances that each specify a link between exactly three instances: a source instance, a verb instance, and a target instance, wherein the source instance comprises a first one of the entity instances or a first one of the relation instances, and wherein the target instance comprises a second one of the entity instances or a second one of the relation instances;
a database adapter to automatically generate, using the processor, a multidimensional dataset from the associative database, wherein the multidimensional dataset includes one or more measure values and a plurality of dimensions; and
a software module to perform, using the processor, one or more operations on the multidimensional dataset and to output a result from the operations on the multidimensional dataset.

19. The computing device of claim 18,
wherein the associative database stores data in two basic types of items: entity instances and relation instances, and
wherein the relation instances describe associations between items.

20. The computing device of claim 19,
wherein each entity instance has a unique identifier, a name, and a type; and
wherein each relation instance includes a unique identifier, a source identifier, a verb identifier, and a target identifier.

21. The device of claim 18, wherein the database adapter extracts metadata from the associative database for each dimension of the multidimensional dataset and extracts measure values from the associative database for cells in the multidimensional dataset.

22. The device of claim 21, wherein the database adapter further comprises:
a metadata query builder to, for each of the dimensions, construct a query to identify item instances in the associative database having names from which the metadata for the dimension are derivable; and
a query engine to identify the item instances in the associative database by performing the query on the associative database.

23. The device of claim 22, wherein the metadata query builder constructs a query by performing a method comprising the steps of:
- identifying an entity in the associative database at a top-level of the dimension;
- adding all relations from the top-level entity to a queue;
- removing an item from a head of the queue;
- determining whether the item is already in the query;
- adding the item to the query when the item is not already in the query;
- determining whether the item is a relation item or an entity item;
- adding items from both ends of the item to the queue when the item is a relation;
- determining whether the item represents a next level of the dimension when the item is an entity item;
- determining whether the item represents a last level of the dimension when the item is an entity item and when the item represent the next level of the dimension; and
- pruning items from the query that do not link to levels of the dimension when the item represents the last level of the dimension.

24. The device of claim 22,
- wherein the metadata query builder specifies recursive closure on an entity in the query; and
- wherein when the query engine performs the query, the query engine recursively identifies instances of the entity on which recursive closure was specified in a chain of instances of the entity related by instances of a same relation.

25. The device of claim 22,
- wherein the metadata query builder builds a request tree for each of the dimensions; and
- wherein the query engine obtains a result tree containing the metadata for the dimension.

26. The device of claim 25, wherein the database adapter further comprises a results module to derive a set of index values for the dimension from the result tree and to use the set of index values as the metadata of the dimension in the multidimensional dataset.

27. The device of claim 19,
- wherein the database adapter further comprises a data query builder to construct a query to identify item instances in the associative database that name measure values and, for each of the identified item instances, an item instance from each of the dimensions associated with the identified item instance; and
- wherein the query engine performs the query on the associative database to obtain the item instances from which measure values are derivable and the item instances from which metadata for each of the measure values are derivable.

28. The device of claim 27, wherein the data query builder constructs the query using a method comprising the steps of:
- adding a measure relation to the query;
- adding to the query a measure entity specified by the measure relation whose entity instances have name values from which measure values may be derived;
- adding to a queue an item specified by the measure relation other than the entity specified by the measure relation whose entity instances name measure values;
- removing an item from a head of the queue;
- determining whether the item is already in the query;
- adding the item to the query when the item is not already in the query;
- determining whether the item is a relation item or a measure item;
- adding to the queue an item specified by the item as source item and an item specified by the item as target item;
- determining whether the item represents a lowest level of a dimension when the item is an entity item;
- adding to the queue relations that specify the item as a source item or as a target item when the item does not represent the lowest level of the dimension;
- adding to the query a query that identifies item instances in the associative database for the dimension when the item represents the lowest level of the dimension;
- determining whether the queue is empty; and
- pruning from the query relations that do not link to levels of the dimension or measures.

29. The device of claim 19, wherein the database adapter further comprises an On-Line Analytical Processing adapter to insert the metadata from each of the dimensions into a multidimensional dataset and to insert the measure values into cells in the multidimensional dataset.

30. The device of claim 18, wherein the database adapter receives input that specifies a plurality of entity items in the associative database from which index values for the dimensions of the multidimensional dataset are derivable and receives input that specifies a relation in associative database that specifies an entity in the associative database having entity instances that have name values from which measure values for cells of the multidimensional dataset are derivable.

31. The device of claim 18, wherein the software module applies OLAP to the multidimensional dataset to display the information based on the multidimensional dataset.

32. The device of claim 18, wherein the device further comprises a persistent storage medium to store at least some of the multidimensional dataset.

33. A computer-readable storage medium comprising stored instructions, the instructions causing a programmable processor to:
- execute software to automatically generate a multidimensional dataset from an associative database by accessing the associative database to extract (i) metadata for each dimension of the multidimensional dataset, and (ii) measure values from the associative database for cells in the multidimensional dataset, wherein the associative database conforms to an associative database model, wherein the associative model defines two types of items: (1) entities, each of the entities comprising one or more entity instances, each of the entity instances comprising a discrete item with independent existence; and (2) relation instances that each specify a link between exactly three instances: a source instance, a verb instance, and a target instance, wherein the source instance comprises a first one of the entity instances or a first one of the relation instances, and wherein the target instance comprises a second one of the entity instances or a second one of the relation instances;
- perform one or more operations on the multidimensional dataset; and
- output a result from the operations on the multidimensional dataset.

* * * * *